United States Patent [19]

Leen

[11] Patent Number: 5,098,584
[45] Date of Patent: Mar. 24, 1992

[54] METHOD FOR SEPARATING OILS FROM SCUM

[75] Inventor: Charles L. Leen, Grand Rapids, Mich.

[73] Assignee: City Management Corporation, Detroit, Mich.

[21] Appl. No.: 575,706

[22] Filed: Aug. 31, 1990

[51] Int. Cl.⁵ .................................................. B01D 37/00
[52] U.S. Cl. ................................... 210/768; 210/774; 210/776; 210/780; 210/806; 210/808
[58] Field of Search ............. 210/774, 776, 770, 768, 210/769, 771, 780, 781, 608, 767, 806, 808; 44/51, 71, 50; 110/8 P

[56] References Cited

U.S. PATENT DOCUMENTS

| | | | |
|---|---|---|---|
| 1,586,449 | 5/1926 | Jones | 210/747 |
| 3,991,689 | 11/1976 | Rinecker | 110/8 P |
| 4,248,709 | 3/1981 | Irving | 210/769 |
| 4,378,229 | 3/1983 | Leen | 210/768 |
| 4,394,135 | 7/1983 | Andress | 44/71 |
| 4,569,767 | 2/1986 | Gill | 210/718 |
| 4,647,383 | 3/1987 | Urbani | 210/768 |
| 4,687,584 | 8/1987 | Urbani | 210/769 |
| 4,719,015 | 1/1988 | Urbani | 210/768 |
| 4,775,388 | 10/1988 | Beshore | 44/51 |
| 4,828,719 | 5/1989 | Katinger | 210/780 |

OTHER PUBLICATIONS

SWECO, Vibro-Energy Separator; 1967.

Primary Examiner—Robert A. Dawson
Assistant Examiner—Ana M. Fortuna
Attorney, Agent, or Firm—Morgan & Finnegan

[57] ABSTRACT

Product, method and apparatus for producing separated components from scum are taught. The separated component is a vegetable-based oil or animal-based oil comprising principally stearic and linoleic acid. The method comprises the steps of collection or harvesting of the scum, heating of the scum, grinding in a low speed unit, filtering through a screen, vibrating or preferably centrifuging and odor control of the scum.

8 Claims, 2 Drawing Sheets

METHOD FOR SEPARATING OILS FROM SCUM

FIELD OF THE INVENTION

The present invention relates to a method for treating sewage scum and more particularly to a method for separating products from the sewage scum. The invention also relates to an apparatus for performing the method and to the resulting product which can be used, for example, as a fuel source, that is, as an ignitable fuel or as an animal food supplement.

BACKGROUND ART

As used herein, the term "sewage" refers not only to raw sewage, but also to by-products obtained during the treatment of the sewage. Similarly, the term "scum" as used herein means the portion of the sewage which floats on top of the raw sewage and which is conventionally skimmed from the top of the sewage. Sewage scum is primarily composed of fats, oils, greases, and the like, hereinafter sometimes collectively referred to as oil or as component product, and are mixed with both water and assorted solids. Due to the water and assorted solids in this sewage scum, it has a low combustibility. The unprocessed scum is contaminated with many undesirable elements. The scum contains dirt, rocks, sticks, human hair, and other floatables.

Sewage scum has previously been disposed of by grinding, landfill disposal, incineration or other methods. Such disposal of scum is not only expensive, but also a waste of a valuable energy source. Therefore, converting the scum to a usable oil and utilizing this valuable energy source eliminates cost associated with disposing the scum.

Because the scum has a very large water content and a very large solid content, there is a substantial variation of BTU in the product. This causes high maintenance problems with incinerators and problems with air pollution control, if the mixture is blended with sludge and then subsequently burned. The burning generates "hot spots" which increases maintenance cost. These "hot spots" are caused by the water and the solids found in the scum. Consequently, removal of solids is an additional problem. Grease or scum, which is fatty acid-based, has the ability to suspend a great many solids. Very fine solids are particularly difficult to remove.

According to prior art methods, emulsions are formed. Some portion of the water can be removed from them; however, a portion of the water is transformed to emulsions in known methods. These emulsions are generated when water and dirt particles are brought in close proximity by mixing, heating, or other physical-chemical processes used in the prior art. Heated air is a typical medium for emulsion generation. Steam coils traditionally used in heating waste fuels, generate emulsions by supplying energy so that heat, water, and oil are emulsified or forced into a phase which is neither a true oil phase or a water phase at the steam coils.

An addition problem is hair removal. Without efficient hair removal, subsequent treatment of the scum is rendered ineffective and the resulting product is undesirable.

Applicant has discovered that if the scum does not have substantial solids and water removed, variation in BTU content causes air pollution problems from both maintenance of equipment and air emulsions.

More particularly, U.S. Pat. No. 4,687,584 to Urbani discloses oil which is collected in a tank comprising oil skimmers, floating heads, and pumps. However, the Urbani process teaches heating scum with a heat exchanger, which aggravates scum problems. Specifically, this process would generate a great amount of emulsions. Similarly U.S. Pat. No. 4,775,388 to Beshore discloses heating sludge using a steam-containing atmosphere and maintaining a pressure of 10 to 700 psig. The temperature range of 90° to 120° C. or use of filtering or press operations dries the sludge The method for dewatering is not critical. This is in contrast to heating scum. Beshore further teaches odor control accomplished by an afterburner. U.S. Pat. No. 3,991,689 to Rinecker grinds the scum and provides a special nozzle which incinerates the product because the water and oil remain mixed The product has a variation in BTU values.

U.S. Pat. No. 4,248,709 to Irving discloses raw scum being introduced into an angled rotating drum. Heated air is claimed to separate oil from scum. The heated air generates substantial emulsions due to greater volumes of heated air used in this process, which is not desirable to effect separation. Municipal sewage treatment facilities decant the water from the scum, blend it with sewage sludge and burn or landfill the mixture Due to the impurities of this mixture, the burning mixture has two wide swings in BTU content which creates erratic "hot spots" and cooling periods.

U.S. Pat. No. 4,378,229 relates to a method for treating sewage in which the combustible components of the sewage are separated from the sewage and used as a fuel. Scum is collected from screened sewage. The scum comprises oils, greases, fats, water and intermixed solid material. Separation occurs by sedimentation so that the combustible materials are separated from other components. Then the combustible materials are separated from water and solid material by biochemical and biophysical reactions which provide for phase separation. Further dewatering and debris removal is effected by conventional means such as pumping. The product is combustible and can be used as a fuel of much lower BTU content than that of treated scum.

U.S. Pat. No. 1,586,449 to Jones discloses a centrifuge which separates water and emulsion from oil. This patent is based on petroleum-based oils and water rather than scum. U S Pat. No. 4,394,135 to Andress discloses a liquid hydrocarbon fuel containing stearic acid and linoleic acid. Scum is animal and vegetable-based oil with minor amounts of mineral oil.

Applicant has overcome the disadvantages associated with the prior art processes by recognizing the problems associated therewith, including emulsion formation, and by achieving a usable product substantially devoid of water, dirt and debris including human hair and having a low sulfur content. The product has a substantial uniform BTU content equivalent to #6 diesel fuel.

SUMMARY OF THE INVENTION

The present invention overcomes the disadvantages of the previously known disposal means by a method and apparatus which provides a separated component which has minimal sulfur, water, dirt, and debris. According to the invention, water and very fine solids, which are suspended in the scum, are removed. The component is produced by substantial reduction in and even absence of emulsion formation. The component is animal and vegetable-based with trace amounts of petroleum rather than mineral-based. The primary steps of the invention includes separating the scum from the sludge, grinding the scum and separating water, solids and the component from the scum by oscillation to produce the component. This process effects increased solids and water removal compared to the prior art. This is accomplished by avoiding emulsion formation as mentioned. Applicant has discovered that emulsion formation, which characterizes prior art processes, actually is a source of non-uniform, that is, variable BTU characteristics which causes the mention erratic burning. Applicant has further discovered how to avoid the problem and effect a product having substantially uniform BTU characteristics. Thus, applicant not only discovered the problem but also its solution.

Prior products also contained varying amount of human hair which effectively blocked all types of fuel filters and cause "fire flys" when burning unfiltered fuel. "Fire flys" are bits of particles which burn at a different temperature thereby fouling the burner tip and in the worst case will cause an automatic shut down of most modern burners with infrared scanners.

The invention relates to a method for substantially eliminating emulsion formation during separation of components from sewage scum comprising heating said sewage scum with low pressure steam whereby formation of air emulsion and odor are minimized; grinding said sewage; preheating separating means with steam; and separating solids and liquid in said sewage scum from said components by oscillating said separating means from about 20° to about 140° whereby solids move primarily vertically with a minor horizontal movement to form a rope of solids which aids in separation of liquids from solids. The liquid is further treated to separate water from oil content by any conventional method such as centrifugation, vacuum distillation, polyelectrolyte addition and pressing. Components are recovered virtually free of water, dirt and debris. Elimination of emulsion formation is critical to the invention.

The invention further relates to a separated sewage scum component comprising a fatty acid base substantially free of water, dirt and debris having a sulfur content less than about ½% by weight. The removal of water from the product inhibits further fatty acid development thereby stabilizing the odor of the product.

The invention also relates to a fuel comprising a non-petroleum based separated sewage scum component, which is fatty acid based and substantially free of water, dirt and debris, having a sulfur content less than about ½% by weight.

The invention relates to a fat comprising a separated sewage scum component, which is fatty-acid based and substantially free of water, dirt and debris, having a sulfur content less than about ½% by weight. The invention also relates to a grease and a food additive as a product.

The invention also relates to a method of solvent distillation comprising treating sewage including heavy metals with a separated sewage scum component, which is fatty acid-based and substantially free of water, dirt and debris having a sulfur content less than about ½% by weight.

The invention relates to an apparatus for substantially eliminating emulsion formation during separation of components from sewage scum comprising steam heating means for sewage scum and for minimizing formation of emulsions and odor; grinding means for grinding solids and said sewage scum; preheated oscillating means for separating liquid from other components primarily using vertical movement; and recovery means for recovering components.

BRIEF DESCRIPTION OF THE DRAWINGS

The invention is depicted in the following nonlimiting figures.

The invention will now be described with referenced to the accompanying drawings

DESCRIPTION OF THE INVENTION

Scum is collected in a waste water treatment plant (WWTP). Influent sludge and scum enters the primary receiving tank 10 or alternatively the secondary receiving tank 12. The addition of chemicals, such as lime, should be avoided because these chemicals reduce the fuel value of the scum. When the scum is transferred from the WWTP to the process facility, a high speed centrifugal pump is avoided because such devices tend to generate emulsions. By slowing flow of sewage, greases and oil along with the associated solids rise to the surface of the water. In another embodiment, the scum is heated by saturated low pressure steam, approximately 15 psi, preferably less than about 10 psi, injected directly into the scum. Alternatively, a heat exchange system could be used which would accept solids. Heated air is not desirable in this invention. Heating occurs in a manner which avoids emulsion formation.

Figure 1:
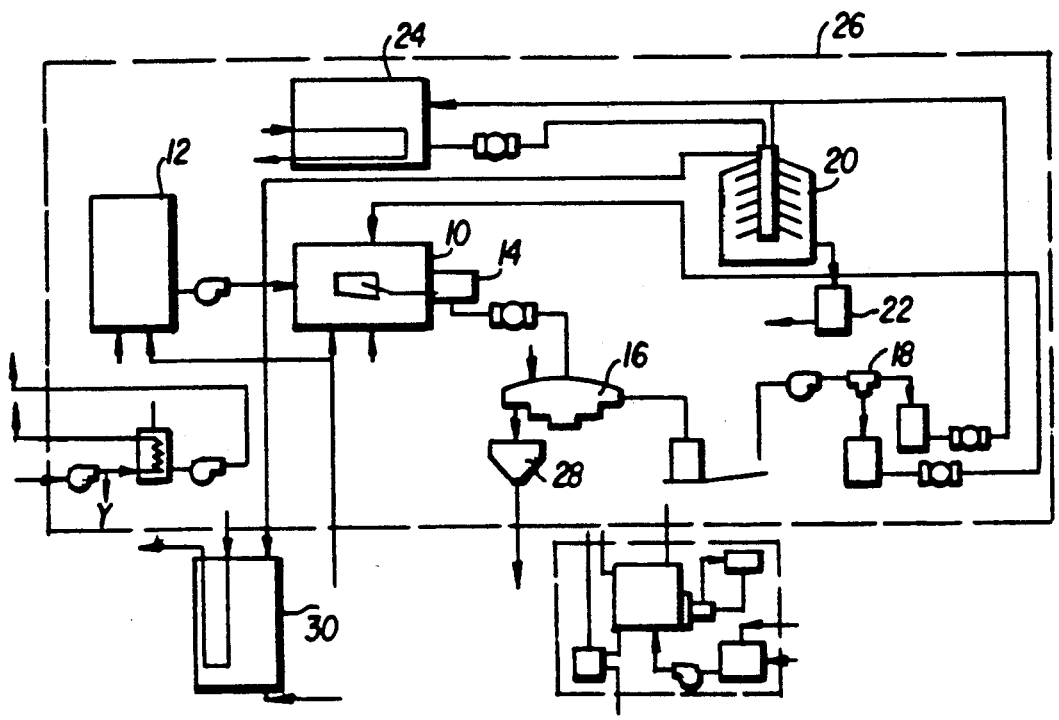
FIG. 1 is a flow chart diagram illustrating a scum treatment system utilizing the method of the present invention.
Figure 2:
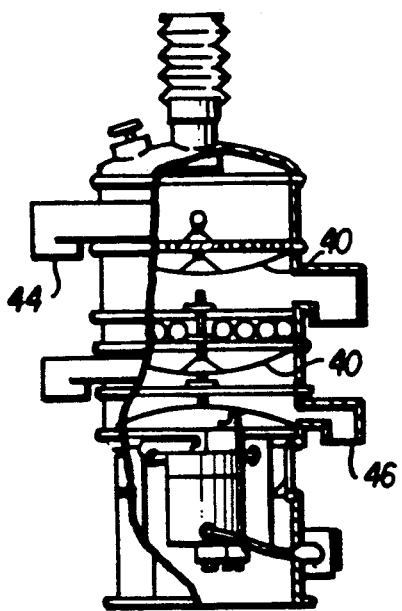
FIG. 2 is a side cross-sectional view showing a separator.
Figure 3:
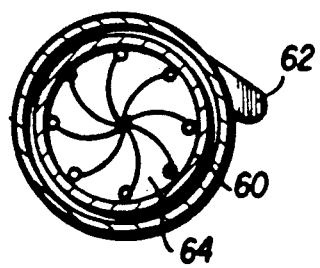
FIG. 3 is a top cross section view showing a screen and rope.

Once the scum is heated to approximately 180° F. to 200° F., it is transferred to a low speed grinder 14. This grinder reduces and standardizes the solids prior to screening preferably to a size less than about 160 microns. Next the scum is pumped by an air driven pump to the vibrator or oscillatory separator 16 which includes a screen. This stage is important to remove oil/water material from the solid material. The solids are separated and placed in the solid drop box 28. The separating step must eliminate solids from the oil water material which solids are no greater than 160 microns, that is by use of a 90 mesh screen, preferably a 60 mesh screen. The vibratory separator as shown in FIG. 2 may comprise various stages of screening 40 to sequentially remove solids greater than 160 microns. Scum enters at entrance 42, and solids are removed at the exit 44. The separated oil/water is removed at the bottom exit 46 as seen in FIG. 3.

On each of the screens it is advantageous to form a solid "rope" 60 of oversized material which bypasses the spout 62 and rides along the inside of the screen. The solids are removed from the outer areas of the rope and are added to the inner areas of the rope. This rope aids in breaking the side velocity of the liquid which moves towards the perimeter of the liquid and acts as a dam against the liquid being discharged through the oversized spout. The screening stage removes human hair from the raw material.

For optimal screening efficiency, the material must have vertical movement as it travels across the screen.

The amount of vertical movement varies with the characteristics of the material. A heavy coarse or wet material usually requires extreme vertical action. A light or very fine material may require less vertical action. The separator and associated equipment should accept steam which is heated to 220° F., preferably between about 180° to 190° F. The separator should be capable of stacking the screens to permit sequential solid removal. The mesh size of the screens becomes progressively larger, that is, progressively smaller apertures in the direction of fluid flow. The screens should be secured in the middle and oscillate towards the perimeter of the screen. The angle of oscillation should be variable and very from, approximately 20° to 140°. In the preferred embodiment, the angle of the oscillation should be 25° to 30°. The motion of the screens results in the solids having a primarily vertical direction with a slight horizontal motion. In the preferred embodiment, the screens are circular to enhance rope development.

The flow rate of the scum through the separator determines the percentage of solids separated from the oil/water mixture. Generally greater feed rate results in a lower removal percentage. The separator screen permits the oil water mixture to pass through the screens in such a manner which will collect the solids without blinding the filtering system and which permits continuous flow of material. This is aided by heating of the filter means; however, it must be done in such a manner that it minimizes or eliminates two undesirable outputs, that is, production of an emulsion and creation of great amounts of odorous air. The ideal heating material must hold pressurized saturated steam. Any steam at 10 psi or less is sufficient to minimize production of odor and production of air emulsions. FIG. 3 shows the screen surface 50, the rope material 52 and the discharge spout 54.

The following description refers to the preferred embodiment. A typical screening means is described in Sweco Vibro-Energy Separator Manual of directions by Sweco Inc., November 1986 which shows stacked screens which are secured in the middle and which oscillate towards the perimeter to produce a rope of material.

Following the vibratory separator, the oil/water mixture is pumped from an open tank to a cyclonic separator 18. The vibratory or centrifugal separator 18 separates fine solids from liquid phase, that is, it will remove solids passing the 160 micro screen but larger than 15 microns.

The solid material from the cyclonic separator are returned to the primary receiving tank 10. The oily material is optionally pumped by an air driven pump into the holding tank 24 or pumped directly to centrifuge 20. Other conventional mechanisms can be used to separate water from oil. In another embodiment, the cyclonic separator 18 is a three-phase separator capable of removing any additional solids and water from the fuel product. The holding tank 24 pumps by an air driven pump, the oil into the centrifuge 20. Following the centrifuging, the fuel product is pumped by an air driven pump into a storage tank 30. The waste water, which the centrifuge has removed from the fuel product, is placed in open tank 22 and recycled for biological treatment.

Steam is used in various phases to aid in the handling of product. Water and fuel are fed into a boiler which produces steam. It is applied to the secondary receiving tank 12, the primary receiving tank 10, the holding tank 24, the vibratory separator 16, and the centrifuge 20. In this separator, the steam warms both the screens and the material entering the separator.

Although the process as such does not address odor control, this problem is conventional in scum processing. The present process develops odor primarily in the heating and screening stages. This process seals the process tanks, the screen unit, the collection of solids unit and the oil/water vessel while heating them. This closed system prevents escape of a obnoxious gases in the enclosed process area. The sealed process tank is connected to a heat exchanger capable of cooling the gases that build in the tank. The cooled gas steam is passed through the gas phase activated carbon unit which traps any odorous gases before they escape to the atmosphere. Additional odor control may be achieved by the use of gas burners placed in the air stream after the carbon unit. The output of the separator 64 and the centrifugal separator 68 temporarily may be stored in storage, preferably in a 55 gallon drum.

Figure 4:
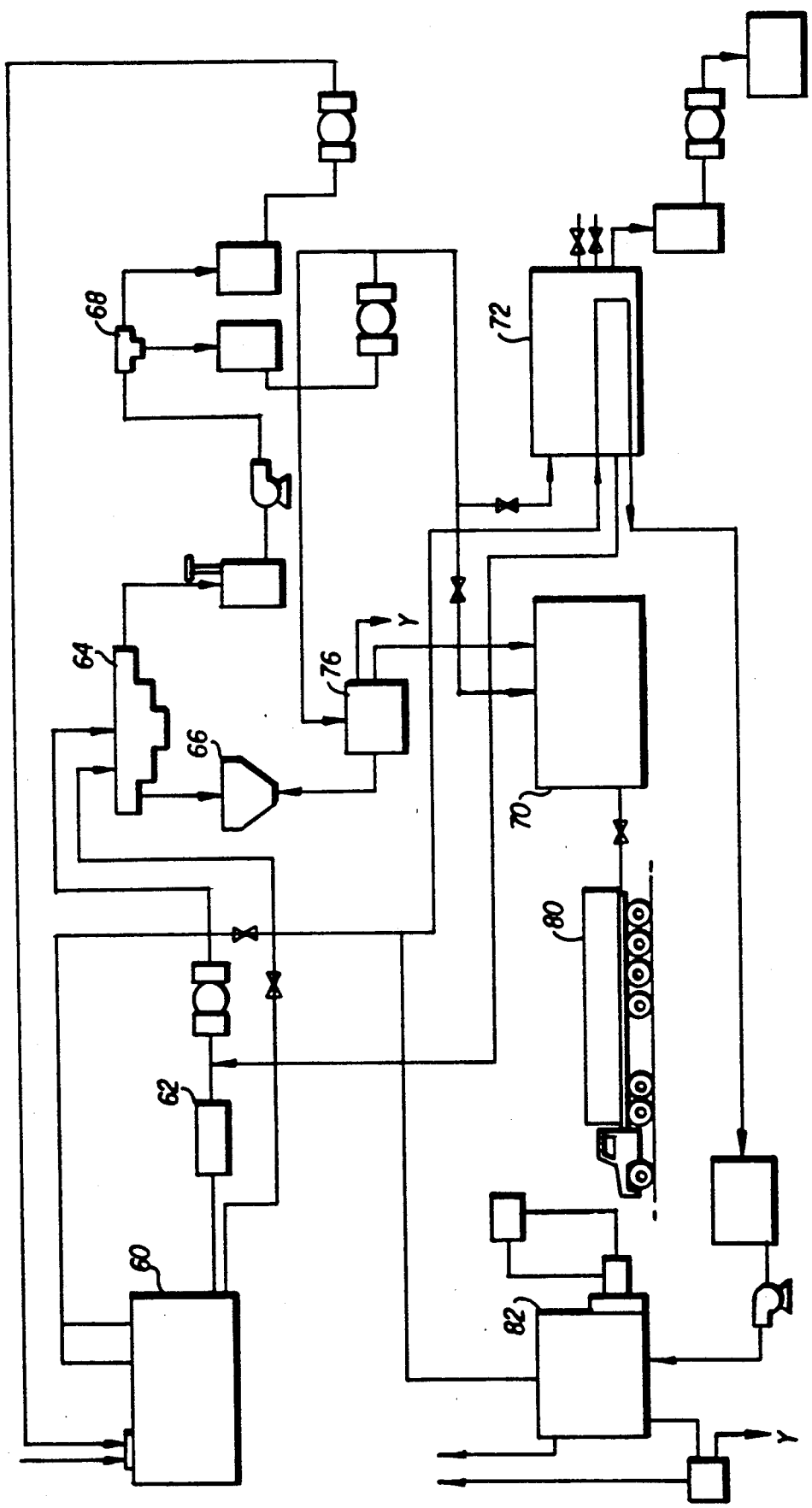
FIG. 4 is a flow chart diagram illustrating an alternative scum treatment system utilizing an alternate method of the present invention.

An alternate method of producing oil is shown in FIG. 4. The scum from the waste water treatment plant is collected in insulted receiving tank 60. From receiving tank 60, the scum is transferred to grinder 62. The grinder reduces and standardizes the solids prior to screening. Alternatively, the scum from the receiving tank can be sent directly to the separator. From the grinder 62, the scum is pumped by an air driven pump to the separator 64. It removes the oil/water material from solid material It is placed in the solid drop box 66. From the separator 64, the oil/water material is pumped to the centrifugal separator 68. Here the oil is separated from the water. The oil is pumped by an air driven from the cyclonic separator 68 to storage tanks 70, and the water and emulsion is transferred from the cyclonic separator 68 to the receiving tanks 60. Instead of being transferred from the cyclonic separator 68 to the receiving tank 60, the fuel may be placed in a holding tank 72. From that holding tank the material may be placed in the dump box 74 or alternatively reintroduced to the separator 64. From the storage tank 70, the oil may be placed in centrifuge 76 to produce additional separation The output of the centrifuge 76 is placed in drop box 66 and the oil from the new centrifuge is again placed in storage tank 70. From that storage tank, the oil is placed in truck 80. Steam is used in various aspects of the process The steam is produced in boiler 82 and fed to the receiving tank 60. In addition, the steam from boiler 82 is sent to holding tank 72. The output of the separator 64 and the centrifugal separator 68 maybe temporarily stored in storage, preferably in a 55 gallon drum.

EXAMPLES

The invention will now be described by a nonlimiting example which illustrates the invention.

The scum material that forms the base raw material for this process is defined as the floating material collected from primary sedimentation tanks. The material floats to the top of the sedimentation tank due to a reduction in velocity of the waste water through the tank.

Once the scum floats to the surface of the tank, it is skimmed to the surface of the sedimentation tank and collected in collection vessels located near the tank.

The material in the collection vessel consists of three distinct phases, i.e. a debris phase, an oil phase, and a water phase.

The debris phase is primarily solid material that due to its density floats to the surface with the oil material. An example of this phase would be plastic straws. This phase represents about 30% of the total volume collected.

The oil phase is a combination of animal and vegetable oils contaminated by some solids. The oils presented in this phase comes from many sources, but they are primarily from animal and vegetable sources and include linoleic, stearic, and butyric acids.

After the scum material or trap grease is collected, it is allowed to dewater or concentrate.

The present method takes the concentrated scum or trap grease which now contains 20% solids, 50% oil, and 20% water and refines it to a useful product, in this example, a fuel product.

The first stage in the process treatment is the moving of the scum or trap grease to an insulated tank. This tank has several steam lances introduced to the lumen of the tank. The function of these lances are to introduce low pressure saturated steam, here about 15 psig. Once the product reaches 180° F., it is passed through a low speed grinder. The function of the grinder is to reduce the solids to uniform size preparatory to being screened, here less than about 160 microns.

Once the material has passed through the grinder, the product is passed through a two-stage Sweco ® screen which has a vertical oscillation between 25° and 35° at a feed rate of about 40 gal/min. The top circular screen is a 29 mesh (approximately 800 microns). This removes the coarse solid material which is collected in a drop box. The material continues through the screen to the next circular screen. This is an 80 mesh screen (177 microns). This screen removes fine material including human hair. After passing through the final circular screen, the liquid phase is then collected and pumped to a second receiving tank that contains heating coils. The function of this tank is to insure that the liquid is maintained at 180° F. prior to being sent through the centrifuge.

The vertical high speed three-phase centrifuge completes the treatment process and is operated in a manner known to those skilled in the art to remove water from oil, here 3650 rpm, 9600 g's.

Once the oil has been centrifuged, it is then sent to a product storage tank. The material is kept at a temperature greater than 140° F.

As described above, the material can be added to heavy fuels, here, a No. 6 diesel oil. It lowers the viscosity of the heavy fuel resulting a product with a lower pour point than either the heavy oil or the recovered oil.

The product contains very low solids, very low water, consistent BTU and very low loss to emulsion. The product developed by the process is virtually water free—less than ½ of 1% moisture by weight. Essentially, all dirt and debris have been removed; and because the water has been removed, the free fatty acid development has been halted. The product is fatty acid based, and by its very nature has very little sulfur, that is between about 1⅜% and about ¼% by weight. The product includes linoleic, stearic or butyric acids.

The oil component product can be used as a number six diesel fuel replacement. Because the oil product is a fatty acid, it mixes well with number 6 diesel fuel which is petroleum based. Interestingly, both are congealed at room temperature. When both are mixed the resulting product will pour. The fuel product maintains its ability to resuspend solids and due to the special characteristic it could be used to resuspend ground flammable waste which are fine enough to be introduced into the fuel. The fuel product has a substantially uniform BTU value of approximately 16,500 BTU per pound, and it can be used as a fuel additive for many viscous fuels making the resulting mixture more useful. Its low sulfur content makes it an ideal candidate for blending with high sulfur fuels.

More generally, the hydrocarbon liquid fuel employed in the present invention may be mixed with any suitable liquid hydrocarbon fuel oil. The liquid hydrocarbon fuel which is used comprises a product of the present invention and fuel oils of various grades (for example, numbers 1, 2, 3, 4, 5, as well as 6 fuel oils or mixtures thereof), residuals, crude oil, coke, oven tars, shale oil, bitumen or other suitable liquid hydrocarbon fuels. The preferred fuel oil component comprises numbers 4, 5 as well 6 fuel oil. The above listing is not intended to be all inclusive and one skilled in the art can readily determine which types of fuel oils can be used as the fuel oil component of the present invention.

The oil product has additional uses in the brown grease market, the animal food market and as a specialty food. The brown fats are similar to conventional brown fats which have a high calorie content and can be used as food additive in animal food. Because fatty acids are appealing to animals such as dogs and cats, it can be used as an additive to pet food. Inclusion of many fatty acids in this material makes it an ideal source for precious fatty acids such as linoleic, stearic and butyric acids. Although these fatty acids are present in various quantities, this material has substantial amounts of these materials as well as other fatty acids These could be removed by a variety of methods such as ion exchange, reverse osmosis, high pressure chromatography and vacuum distillation All the process steps described above can be used equally well with trap grease and other solids containing oils and greases. The product could be used to form an organometallic catalyst (or its intermediate) in the solvent distillation of heavy metals from metal bearing sludges.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims It is understood that certain additives such as polymers, polyvalent cations, demulsifiers, etc. can be added to accelerate or ameliorate the separate. The above references are hereby incorporated by reference.

I claim:

1. A method for separation of fuel components from sewage scum wherein emulsion formation during the separation is substantially eliminated, said method comprising: heating said sewage scum with saturated steam at a pressure which minimizes formation of air emulsions and odor; grinding said sewage scum; preheating a separating means with said steam; separating solids and water in said sewage scum from said fuel components by oscillating said separating means from about 20° to about 140° whereby said solids move primarily vertically with a minor horizontal movement to form a rope of solids; and recovering said fuel components virtually free of water, dirt and debris.

2. The method according to claim 1, wherein the temperature of said steam is about 220° F.

3. The method according to claim 1, wherein the pressure of said steam is less than about 10 psi.

4. The method according to claim 1, wherein said sewage scum is heated to a temperature of about 190°.

5. The method according to claim 1, wherein the oscillation is between 25° to 35°.

6. The method according to claim 1, wherein said separation means is a circular screen.

7. The method according to claim 1, wherein the pressure of the steam is less than about 15 psi.

8. The method according to claim 1, wherein the recovered fuel components have a substantially uniform BTU content.

* * * * *